United States Patent
Takeda et al.

(10) Patent No.: US 6,412,872 B2
(45) Date of Patent: Jul. 2, 2002

(54) HEADREST DEVICE

(75) Inventors: Nobuhiko Takeda, Aichi-ken; Hidetoshi Nakane; Hideki Uramichi, both of Toyota, all of (JP)

(73) Assignees: Aisin Seiki Kabushiki Kaisha, Kariya; Araco Kabushiki Kaisha, Toyota, both of (JP)

( * ) Notice: Subject to any disclaimer, the term of this patent is extended or adjusted under 35 U.S.C. 154(b) by 0 days.

(21) Appl. No.: 09/725,723

(22) Filed: Nov. 30, 2000

(30) Foreign Application Priority Data

Nov. 30, 1999 (JP) .......................................... 11-339790

(51) Int. Cl.⁷ ................................................ A47C 7/36
(52) U.S. Cl. ...................................................... 297/391
(58) Field of Search ................................ 297/391, 408, 297/404

(56) References Cited

U.S. PATENT DOCUMENTS

| 4,720,146 A | 1/1988 | Mawbey et al. |
| 4,779,929 A | * 10/1988 | Kuchemann |
| 4,840,428 A | 6/1989 | Kobayashi et al. |
| 4,844,544 A | 7/1989 | Ochiai |
| 4,861,107 A | 8/1989 | Vidwans et al. |
| 5,257,853 A | 11/1993 | Elton et al. |
| 5,290,091 A | * 3/1994 | Dellanno et al. |
| 5,316,372 A | 5/1994 | Amner |
| 5,443,303 A | 8/1995 | Bauer et al. |
| 5,660,441 A | 8/1997 | Nagayasu et al. |
| 5,667,275 A | 9/1997 | Takeda |
| 5,700,057 A | 12/1997 | De Filippo |
| 5,765,918 A | 6/1998 | Wakamatsu et al. |
| 5,820,211 A | 10/1998 | Heilig et al. |
| 5,842,738 A | 12/1998 | Knoll et al. |
| 6,183,045 B1 | * 2/2001 | Marfilius et al. |

FOREIGN PATENT DOCUMENTS

| JP | 61-113653 | 7/1986 |
| JP | 5-269030 | 10/1993 |
| JP | 9-382 | 1/1997 |
| JP | 9-149837 | 6/1997 |
| JP | 11-147433 | 6/1999 |

* cited by examiner

*Primary Examiner*—Milton Nelson, Jr.
(74) *Attorney, Agent, or Firm*—Burns, Doane, Swecker & Mathis, LLP

(57) ABSTRACT

A headrest device ensures the movement of a headrest frame body to a stay and enables a foaming resin molding of a headrest. A support portion having a semicircular cross section and restricting portions having an approximately U-shape cross section are formed on a plate body. Two sheets of plate bodies are connected with each other in an opposed manner. Then, a headrest pad made of foaming resin is integrally formed with the plate bodies.

9 Claims, 5 Drawing Sheets

HEADREST DEVICE

BACKGROUND OF THE INVENTION

The present invention relates to a headrest device having a headrest frame body and a stay, which is used in an automobile seat, and more particularly to a headrest device of which the headrest frame body covers a pair of leg member portions of the stay.

As disclosed in Japanese Patent Laid-open Publication No. 382/1997 or Japanese Utility Model Laid-open Publication No. 113653/1986, for example, a headrest device used in an automobile seat includes, an inverse U-shaped stay having opposing leg member portions which are held by a seat back frame of a vehicle and a connecting portion which connects the leg member portions, and a headrest frame body which supports a headrest pad made of foaming resin. The headrest frame body is extended to a position above the connecting portion of the stay. The connecting portion and the headrest frame body are connected by using brackets or by way of bushings such that a portion of the headrest frame body is curled on the connecting portion.

In such a prior art including means which connects the headrest frame body to the connecting portion of the stay using the brackets and means which connects a portion of the headrest frame body to the connecting portion of the stay by way of the bushing, the center of the headrest frame body is positioned above the connecting portion of the stay. Accordingly, when a load is applied to the headrest device, a force acting on a joint portion between the connecting portion of the stay and the headrest frame body becomes large and hence, it becomes necessary for the joint portion to have a sufficiently large connecting force (fastening force). However, this increases a frictional force and hence, a manipulation force for tilting the headrest is also increased.

In addition, in forming the headrest pad made of foaming resin on the headrest frame body by an integral molding process, it is necessary to prepare a separate member to protect the brackets or the curled portion from the wraparound of the foaming resin thus making the foaming operation difficult.

On the other hand, assuming that the headrest frame body of the prior art is arranged below the connecting portion of the stay, the leg member portions of the stay become an exposed state to the headrest frame body. Accordingly, the rotational movement of the headrest in the back and forth direction becomes difficult due to the integrated foam molding of the headrest pad.

SUMMARY OF THE INVENTION

Accordingly, it is an object of the present invention to provide a headrest device which can overcome such drawbacks of the prior art.

To solve the above-mentioned drawbacks of the prior art, according to the present invention, as a basic structure, a headrest frame body adopts an overlapped structure made of two sheets of pressed members or a structure made of a single sheet of plate-like pressed member by a press-molded process, wherein the press-molded member cover leg member portions of a stay and a restricting portion which enables the tilting or the movement of the headrest in the back and forth direction is provided.

With the provision of such basic constitutional conception, the tilting of the headrest in the back and forth direction becomes easy and there is no possibility that the tilting of the headrest which has an integral structure made of a headrest pad and a headrest frame body by a foam molding is hampered by the headrest pad.

To be more specific, the present invention provides a headrest device including an inverse U-shaped stay having opposing leg member portions held by a seat back frame of a vehicle and a connecting portion which connects the leg member portions, and a headrest frame body which is supported on the stay such that the headrest frame body is rotatable in the back and forth direction about the connecting portion of the stay, wherein the headrest frame body is comprised of a pair of opposing plate bodies, each plate body comprises a support portion of an approximately semicircular cross section which has a portion coming into contact with the connecting portion of the stay and restricting portions of an approximately U-shaped cross section which cover the leg member portions of the stay and restrict the rotation of the headrest frame body about the connecting portion of the stay, and both plate bodies have a relationship where both plates have support portions and restricting portions thereof opposed and fixedly secured to each other.

DETAILED DESCRIPTION OF THE PREFERRED EMBODIMENTS

Figure 1:
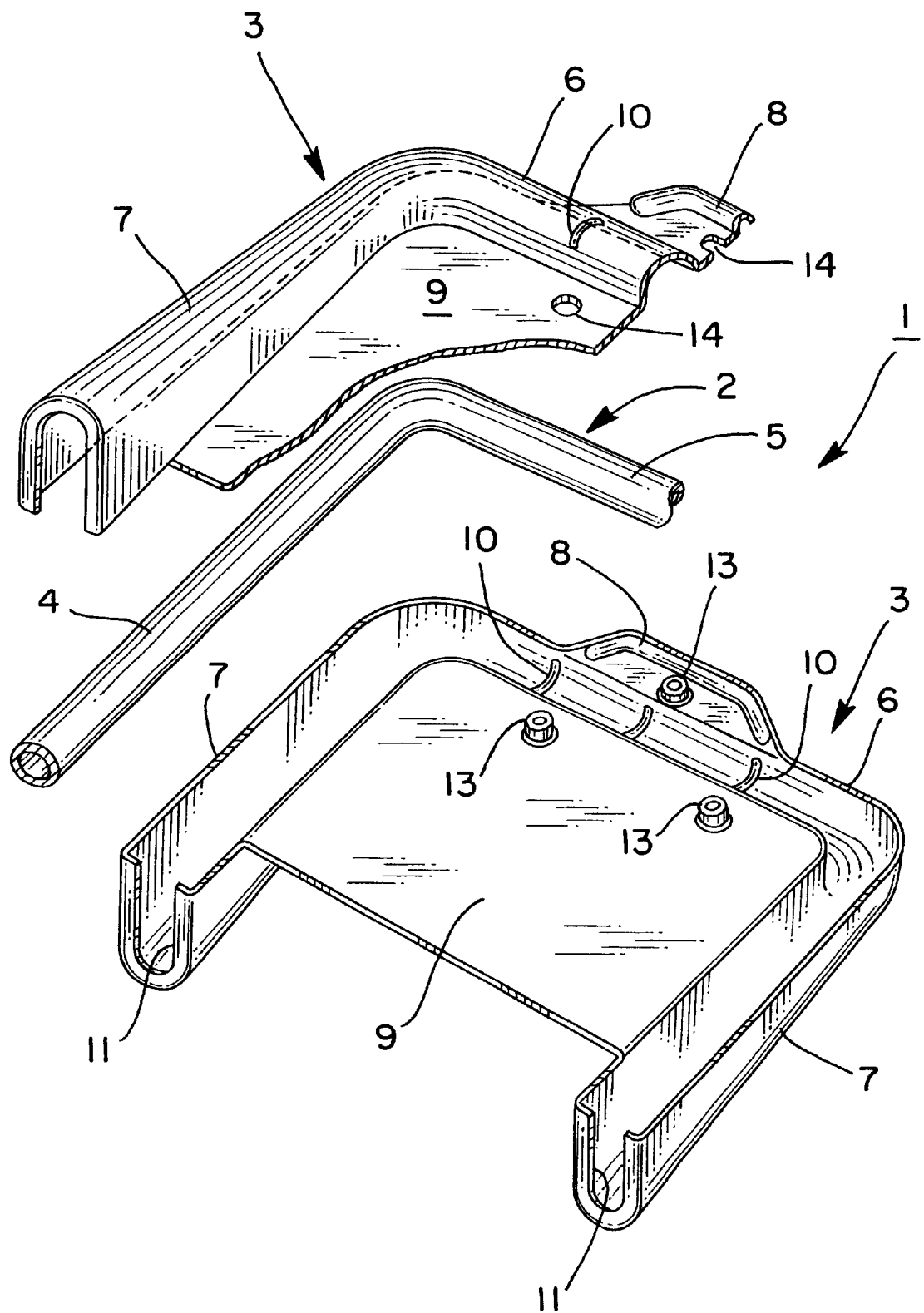
FIG. 1 is a perspective view with a part cut away of a headrest device of an embodiment of the present invention.

An embodiment of the present invention is explained in more detail hereinafter in conjunction with FIG. 1.

A headrest device 1 is comprised of an inverted U-shaped stay 2 and a pair of plate bodies 3, 3. The stay 2 is constituted by opposing leg member portions 4 which are held by a seat back frame of a vehicle not shown in the drawing and a connecting portion 5 which connects both leg member portions 4. The stay 2 is made of a pipe-like or solid rod having a circular cross section.

Figure 3:
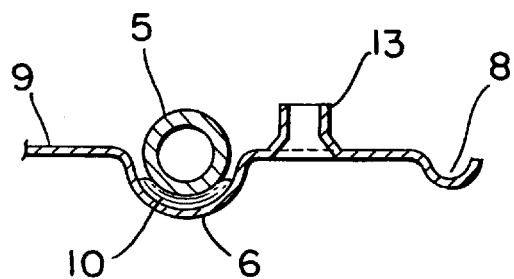
FIG. 3 is a partial cross-sectional view showing a bead portion.

Each plate body 3 is formed by pressing a metal sheet and is comprised of a support portion 6 which has an approximately semicircular cross section and covers the connecting portion 5 of the stay 2 and restricting portions 7, 7 which each has an approximately U-shaped cross section and a triangular side surface (in side view) having a wider width at its free end and covers each of the leg member portions 4 of the stay 2. The plate body 3 has a bead portion 8 (see FIG. 3) designated by the laws and regulations. A planar portion 9 is formed between both restricting portions 7, 7.

Figure 4:
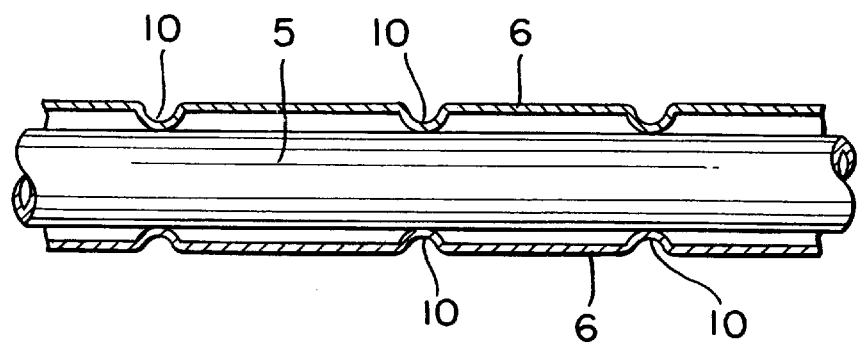
FIG. 4 is a cross-sectional view of a friction holding portion defined between a stay and a headrest frame body.

A plurality of protruding portions 10 which bulge inwardly are formed on an inner peripheral surface of the support portion 6. These protruding portions 10 are brought into friction contact with an outer peripheral surface of the connecting portion 5 of the stay 2 thus providing a frictional movement of the headrest (see FIG. 4).

Flange portions 11 which are directed inwardly are formed on free end peripheries of the restricting portions 7, 7. By bringing the flange portions 11 into contact with the leg member portions 4 of the stay 2, the tilting angle of the plate body 3 to the stay 2 is regulated.

Figure 5:
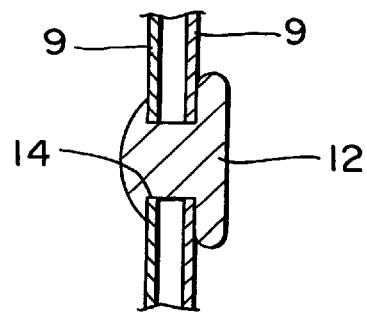
FIG. 5 is a cross-sectional view showing a pin caulking.
Figure 6:
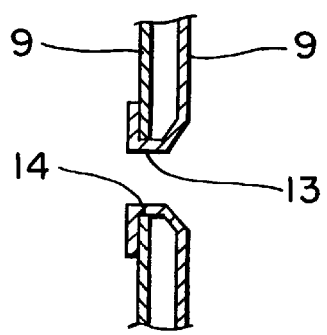
FIG. 6 is a cross-sectional view showing a burring caulking.

Respective plate bodies 3, 3 are arranged in the left-and-right (or front-and-rear) symmetry and have the equal shape. Both plate bodies 3, 3 are jointed such that both plates bodies 3, 3 are coupled by performing a pin caulking using pins 12 as shown in FIG. 5 or by forming burring 13 on one planer portion 9 and performing a burring caulking through a hole 14 formed on the other planer portion 9 as shown in FIG. 6. The coupled plate bodies 3, 3 constitute a headrest frame body. The caulking position may be arranged at three positions as shown in FIG. 1, wherein the caulking is performed at two left-and-right symmetrical positions at an upper portion of the planar portion 9 and the caulking is performed on a center line of the planar portion 9 disposed between the bead portion 8 and the support portion 6.

Besides caulking, portions of respective plate bodies 3, 3 may be brought into contact with each other and are adhered to each other by a spot welding.

Figure 2:
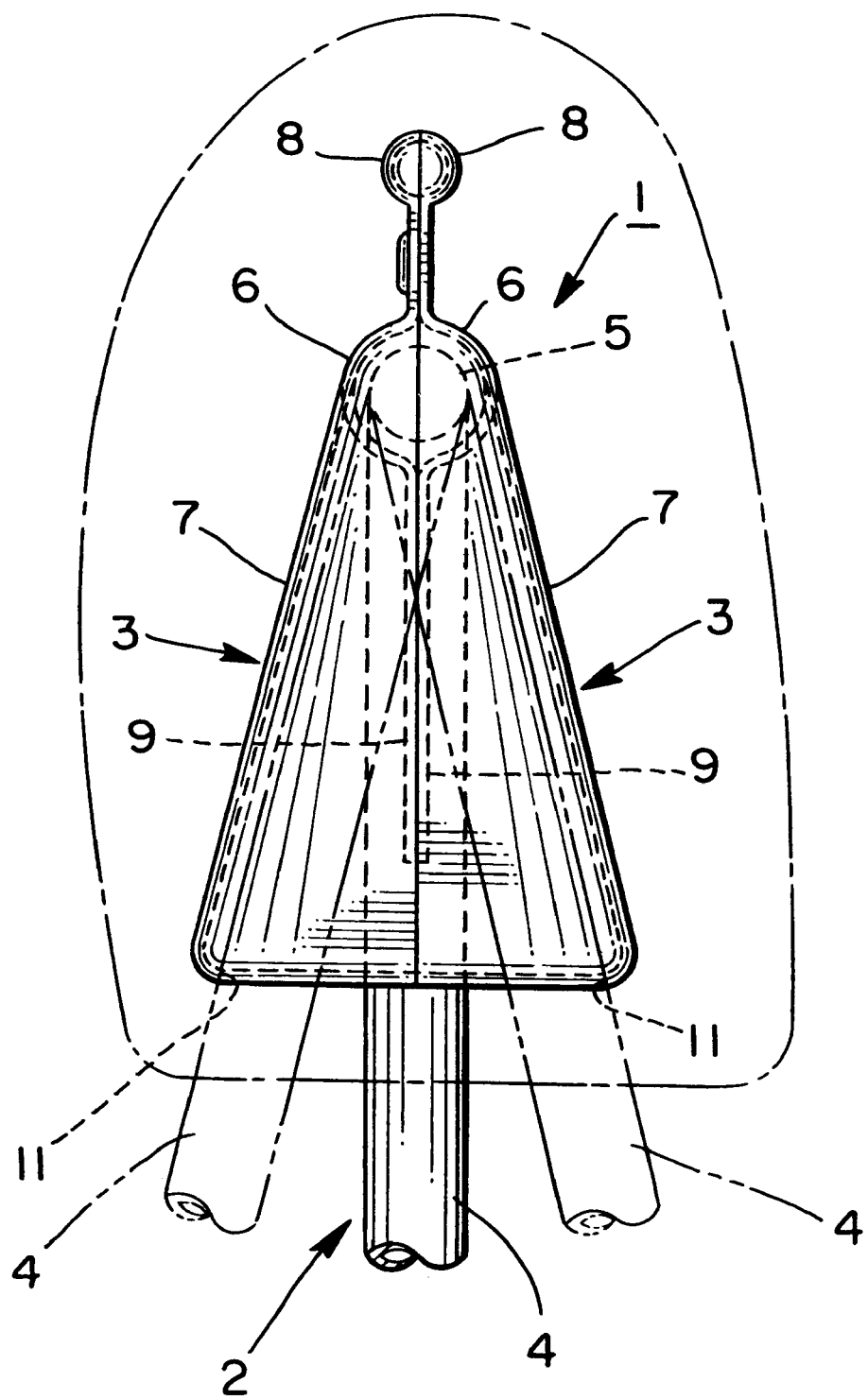
FIG. 2 is a side view of the headrest device of the embodiment shown in FIG. 1 in the assembled state.

The movement of the headrest frame body constituted by the plate bodies 3, 3 is explained in conjunction with FIG. 2.

The relative movement between the headrest frame body constituted by the plate bodies 3, 3 and the stay 2 is restricted by bringing the flange portions 11 into contact with the leg member portions 4 of the stay 2. Further, the headrest frame body constituted by the plate bodies 3, 3 can maintain its position by the frictional engagement between the support portions 6 of the plate bodies 3, 3 and the connecting portion 5 of the stay 2.

Around the headrest frame body constituted by the plate bodies 3, 3, a headrest pad (indicated by a chain line in FIG. 2) made of foaming resin is integrally formed with the headrest frame body constituted by the plate bodies 3, 3 by a foam molding. In performing this foam molding, the flange portions 11 can prevent the wraparound of the foaming resin into the inside of the restricting portions 7 or can prevent the wraparound of the foaming resin between both opposing planar portions 9 thereby the integrated foam molding of the headrest can be facilitated.

Figure 7:
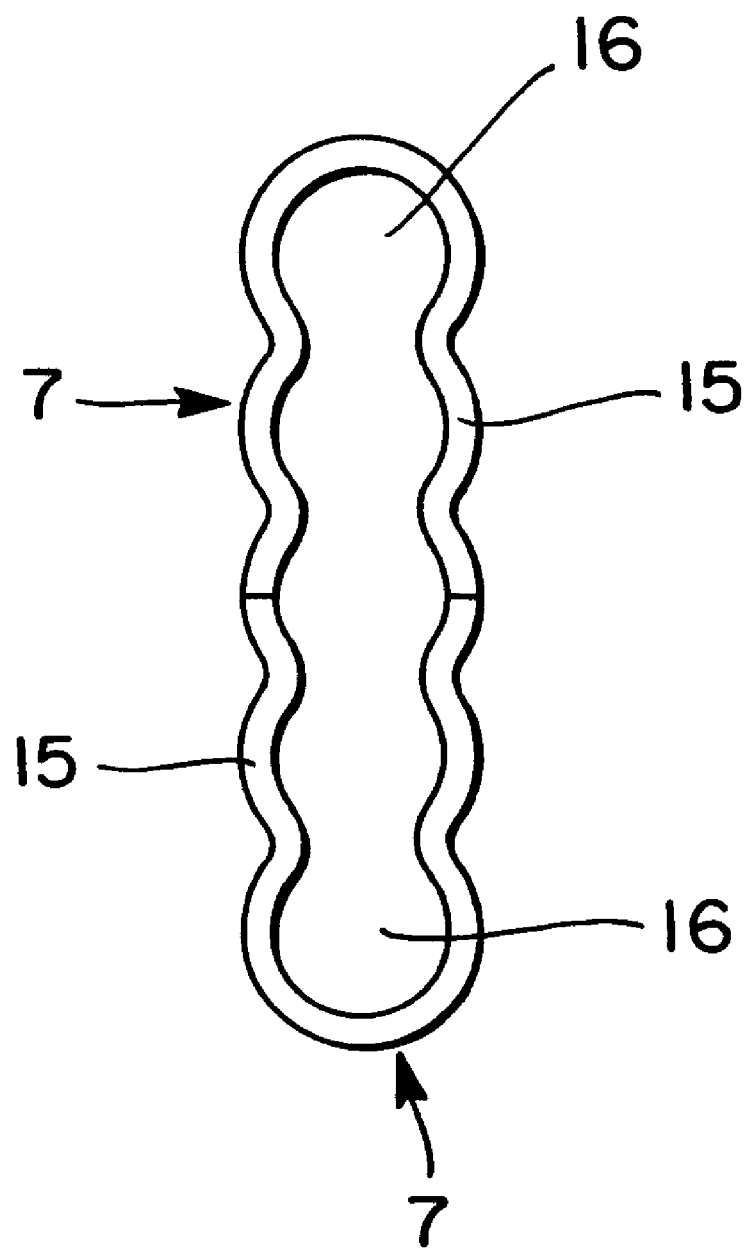
FIG. 7 is a bottom view showing an inner space of a restricting portion.

The inner wall surface which defines a space portion 16 of the restricting portion 7 may have a corrugated shape 15 as shown in FIG. 7. The corrugated shape 15 is formed by contiguously connecting arcuate surfaces having a diameter corresponding to a diameter of the leg member portion 4 of the stay 2. By seating the leg member portion 4 of the stay 2 on respective arcuate surfaces, the tilting position of the headrest frame body constituted by the plate bodies 3, 3 to the stay 2 can be surely held. When it is necessary to change the relative position of the headrest frame body constituted by the plate bodies 3, 3 with respect to the stay 2, the headrest frame body constituted by the plate bodies 3, 3 is pushed in a given direction such that the leg member portion 4 of the stay 2 gets over a small ridge formed between contiguous arcuate surfaces.

Besides such a provision, an insert having the corrugated form 15 may be prepared as a separate member and may be inserted into the space portion 16 of the restricting portion 7.

Figure 8:
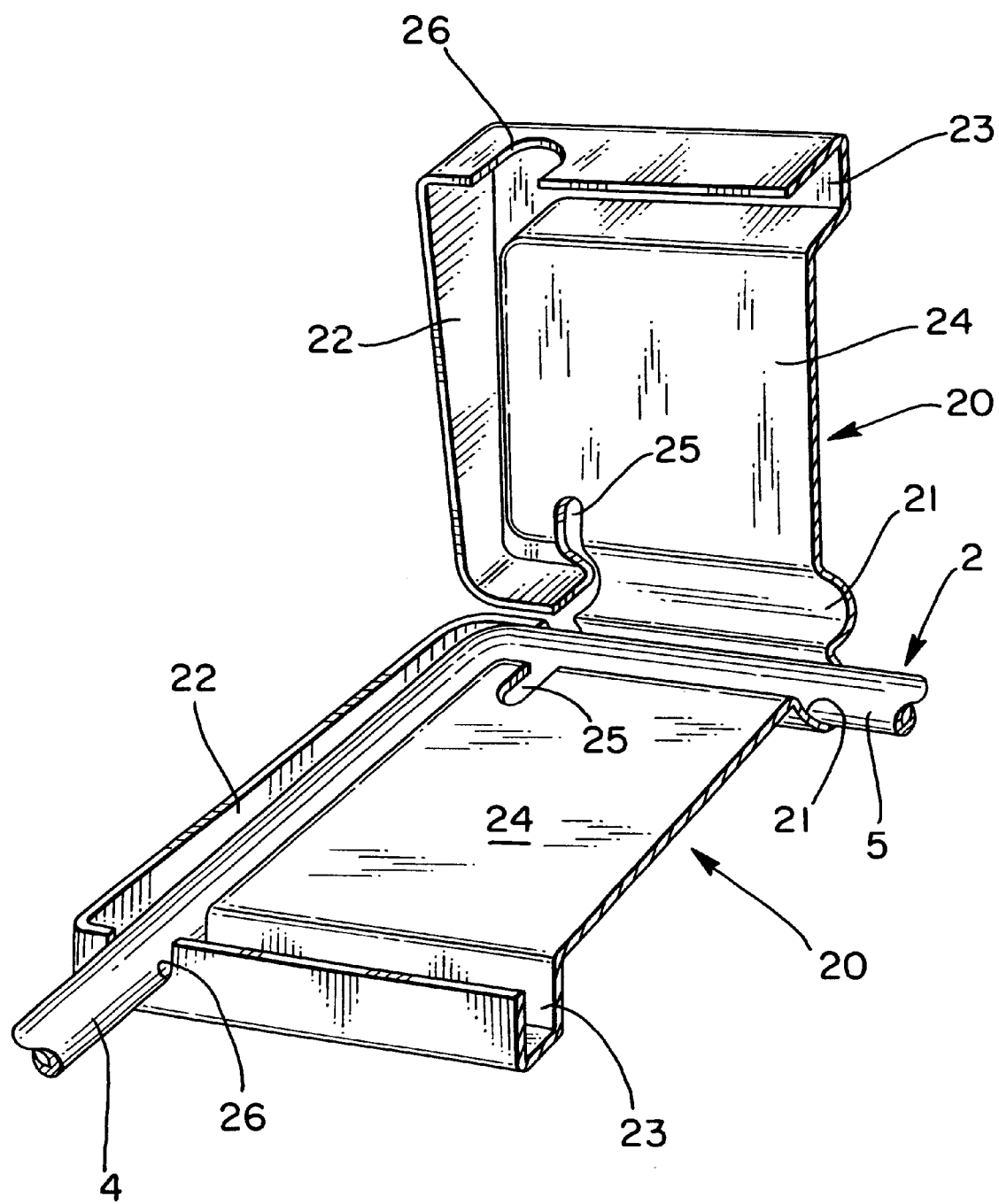
FIG. 8 is a partial perspective view showing another embodiment of the present invention.

In an embodiment shown in FIG. 8, a headrest frame body is produced by forming a pair of frame portions 20 by molding a sheet of metal plate with a press. A pair of frame portions 20 have the equal shape and respective frame portions 20 are arranged in the left-and-right (or front-and-rear) symmetry.

Each frame portion 20 which constitutes the headrest frame body includes an upper groove portion 21, side groove portions 22 and a lower groove portion 23 at a side peripheral portion thereof. By coupling these two frame portions 20 and fixedly securing flat planer portions 24 of the frame portions 20 by a spot welding or the like, the headrest frame body is formed.

The upper groove portion 21 has a semicircular cross section to receive a connecting portion 5 of an inverse U-shaped stay 2. Cutout grooves 25 are formed in the upper groove portion 21 at two portions, preferably, at left and right portions thereof and the upper groove portion 21 extending between the cutout grooves 25 are brought into friction contact with the connecting portion 5 of the stay 2 so as to apply resistance to the tilting of the headrest frame body constituted by the frame portions 20, 20 about the connecting portion 5. Here, the cutout grooves 25 contributes to the adjustment of the friction force between the stay 2 and the connecting portion 5.

The side groove portions 22 have a shape for receiving leg member portions, that is, leg portions 4 of the stay 2. The side groove portions 22 preferably increases the depth of the groove as the side groove portions 22 move in the downward direction such that the side groove portions 22 have a triangular shape when viewed from both sides thereof.

The lower groove portion 23 has a shape suitable for ensuring the rigidity of the frame bodies 20, 20 and is provided with opening portions 26 for allowing the leg portions 4 of the stay 2 to pass therethrough at a lower surface portion thereof. These opening portions 26 restrict the tilting of the headrest frame body to the stay 2.

The flat planer portions 24 of respective frame portions 20, 20 may be brought into contact with each other at the spot welding portions and remaining portions may be spaced apart from each other in an opposed manner. In this case, an amount of distance between the remaining portions is increased as it moves downwardly.

As many apparently widely different embodiments of the present invention can be made without departing from the spirit and scope thereof, it is to be understood that the invention is not limited to the specific embodiments thereof except as defined in the appended claims.

What is claimed is:

1. A headrest device including an inverted U-shaped stay having opposing leg member portions adapted to be held by a seat back frame of a vehicle and a connecting portion which connects the leg member portions, and a headrest frame body which is supported on the stay such that the headrest frame body is rotatable in the back and forth directions about the connecting portion of the stay, wherein the headrest frame body is comprised of a pair of opposing plate bodies, which each comprises a support portion of an approximately semicircular cross section which has a portion coming into contact with the connecting portion of the stay and restricting portions which cover the leg member portions of the stay and restrict the rotation of the headrest frame body about the connecting portion of the stay, both plate bodies having a relationship where both plates have support portions and restricting portions thereof opposed to each other and fixedly secured to each other.

2. A headrest device according to claim 1, wherein the restricting portions of the plate bodies have an approximately U-shaped cross section and triangular side surfaces which have a wider width at free ends thereof and peripheral portions of the free ends have flange portions bent inwardly.

3. A headrest device according to claim 2, wherein inner wall surfaces which define inner space portions of the restricting portions have a corrugated shape.

4. A headrest device according to claim 2, wherein the plate bodies have planar portions between both restricting portions and both planar portions which oppose each other are joined by caulking.

5. A headrest device according to claim 4, wherein the pair of plate bodies have an equal shape.

6. A headrest device according to claim 1, wherein inner peripheral surfaces of the support portions of the plate bodies have protruding portions which are bulged inwardly and the protruding portions are brought into contact with an outer peripheral surface of the connecting portion of the stay.

7. A headrest device including an inverted U-shaped stay adapted to be held by a top portion of a seat back, a headrest frame body having an upper end portion thereof rotatably supported in the back and forth directions on a connecting portion which connects upper end portions of left and right leg portions of the stay, and a headrest pad which surrounds the headrest frame body and forms a head rest body together with the headrest frame body, wherein the headrest body is rotatable in the back and forth direction about the connecting portion of the stay which works as the center of rotation, the headrest frame body being constituted by making a pair of front and rear frame portions which are integrally connected at upper end portions thereof oppose and join each other, fitting grooves having an approximately semicircular cross section and into which an upper portion of the stay is fitted being provided between both frame portions, a pair of left and right side restricting portions which are extended downwardly from respective left and right ends of the fitting grooves and into which respective left and right leg portions of the stay are fitted and through which respective left and right leg portions pass downwardly, the fitting grooves being formed into a shape which applies a given rotational friction force to the connecting portion of the stay being in a state that the stay is accommodated in the fitting grooves, and each side restricting portion being formed into a shape which allows the rotation of a given amount of the headrest frame body in the back and forth direction about the connecting portion of the stay.

8. A headrest device according to claim 7, wherein the stay is formed by bending a rod in an approximately U-shape, the fitting grooves of the headrest frame body being formed into a circular cross section corresponding to the connecting portion of the stay, and each side restricting portion of the headrest frame body being formed into a shape which gradually increases a back-and-forth width thereof in the downward direction.

9. A headrest device according to claim 7, wherein cutout portions are formed in the frame portions such that the cutout portions are formed at both sides of the fitting grooves.

* * * * *